United States Patent
Gracia Verdugo et al.

(10) Patent No.: US 9,662,909 B2
(45) Date of Patent: May 30, 2017

(54) EDGE DETECTOR

(71) Applicant: Hewlett-Packard Development Company, L.P., Houston, TX (US)

(72) Inventors: Antonio Gracia Verdugo, Barcelona (ES); Juan Uroz Soria, Terrassa (ES); Oriol Borrell Avila, Sabadell (ES)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 0 days.

(21) Appl. No.: 15/030,264

(22) PCT Filed: Oct. 23, 2013

(86) PCT No.: PCT/EP2013/072177
§ 371 (c)(1),
(2) Date: Apr. 18, 2016

(87) PCT Pub. No.: WO2015/058795
PCT Pub. Date: Apr. 30, 2015

(65) Prior Publication Data
US 2016/0263915 A1    Sep. 15, 2016

(51) Int. Cl.
*B41J 11/00* (2006.01)
*G01B 11/24* (2006.01)

(52) U.S. Cl.
CPC .......... *B41J 11/0095* (2013.01); *B41J 11/009* (2013.01); *G01B 11/24* (2013.01)

(58) Field of Classification Search
CPC .... B41J 11/0095; B41J 29/393; B41J 11/009; B41J 13/0018; B41J 2/045; B65H 2701/1311; B65H 7/14; G03G 2215/00561; G03G 2215/00721; G01B 11/24
See application file for complete search history.

(56) References Cited

U.S. PATENT DOCUMENTS

| | | | |
|---|---|---|---|
| 7,954,797 B2 | 6/2011 | Sasahara | |
| 8,205,958 B2 | 6/2012 | Endo | |
| 8,215,637 B2 | 7/2012 | Yano | |
| 8,320,814 B2 | 11/2012 | Tsukamoto et al. | |
| 8,339,615 B2 | 12/2012 | Dohi et al. | |
| 2005/0062780 A1 | 3/2005 | Chee | |
| 2014/0354750 A1* | 12/2014 | Garbacz | B41M 5/38292 347/172 |

OTHER PUBLICATIONS

Kaestner, et al. "Imaging and image processing in porous media research." Advances in Water Resources, vol. 31, No. 9, Sep. 2008, pp. 1174-1187.
PCT Search Report and Written Opinion, Aug. 4, 2014, PCT/EP2013/072177, Hewlett-Packard Development Company, Ltd., European Patent Office, 11 pages.

* cited by examiner

*Primary Examiner* — Thinh H Nguyen
(74) *Attorney, Agent, or Firm* — HP Inc—Patent Department

(57) ABSTRACT

A detector device is disclosed for detecting an edge of a medium in a media processing system, the detector device comprising a spectrophotometer and a processing unit, the spectrophotometer scanning a medium in a media processing area and generating an output tuple, the processing unit comparing the output tuple to at least one reference tuple for detecting an edge of a medium. A printing system and method of detecting an edge of a medium in a media processing system are also disclosed.

15 Claims, 4 Drawing Sheets

EDGE DETECTOR

CROSS-REFERENCE TO RELATED APPLICATION

This application is a U.S. National Stage Application of and claims priority to International Patent Application No. PCT/EP2013/072177, filed on Oct. 23, 2013, and entitled "EDGE DETECTOR," which is hereby incorporated by reference in its entirety.

BACKGROUND

An edge detector detects a leading edge and/or side edges of a medium, such as a sheet of paper, foil, fabric or other sheet-like medium, while it is moving into and through a processing area of a media processing system. The media processing system can be, for example, a printer, a scanner or another device for processing sheet-like media. An edge detector can be used for detecting when a medium is entering the media processing device or a media processing zone and for monitoring skewness of the print medium while it travels through the media processing device.

DETAILED DESCRIPTION

In the following detailed description, reference is made to the accompanying drawings which form part thereof, to illustrate specific examples in which the present disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims.

Media processing systems include image forming apparatus such as large format printers that use roll media to span a print zone to receive a fluid, including ink, such as latex-based ink, from a fluid applicator unit. The roll medium may be fed into the image forming apparatus, and be transported through a media processing zone, from an input roller to an output roller. The roll medium, for example, may be transported through a print zone. In another image forming apparatus, such as a desktop printer, single sheets of media are fed into the printer and transported through the print zone. In all of these applications it is desirable to detect edges of the medium to be processed, such as a leading edge and side edges, to determine deposition of the fluid relative to the print zone. Also detecting skewness of the medium as it travels through the image forming apparatus is desirable. Edge determination and skewness monitoring may pose different challenges whether an opaque medium, a transparent medium or a porous medium is to be processed.

In the following, examples of the disclosure will be described with reference to a printing system in which an edge detector device is incorporated. This description has to be understood as being illustrative for possible applications of the disclosure, without limiting the disclosure to printing systems.

Figure 1:
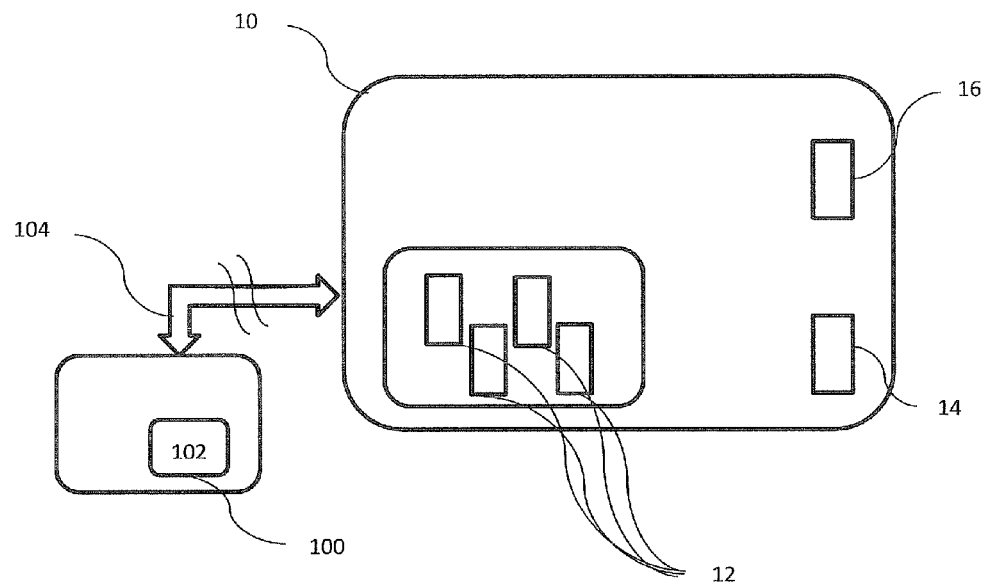
FIG. 1 shows a schematic diagram of an edge detector according to one example.

FIG. 1 schematically shows a carriage 10 of a printing system, such as a large format printer or desktop printer. The carriage 10 carries a number of printheads 12, a line sensor 14, and a spectrophotometer 16. Examples of large format printers are those of the Designjet series and other latex printing systems of Hewlett Packard Corp., USA. These and other high-quality printers include a spectrophotometer for color calibration.

Spectrophotometry is the study of electromagnetic waves in the visible, near-ultraviolet, and near-infrared spectra. A spectrophotometer is a light measuring device that is configured to measure various characteristics of light, including intensity, color, and/or wavelength. Spectrophotometers may be used in printing devices to detect colors and to calibrate the colors printed.

When used as a color detector, the spectrophotometer may include a light source, a light-to-electrical transducer, known as a photodetector, and a filter. In one instance, the light is projected toward an object. The object reflects the light, and the photodetector receives the reflected light. The light may pass through the filter before being received by the photodetector so that the color may be detected. Specifically, the filter is configured to only allow light having a specific range of wavelengths to pass through. This is known as filter response. Light that passes through the filter causes the photodetector to generate an electrical signal. The magnitude of this electrical signal indicates the amount of the specific color of light present. An array of photodetectors and filters allows for the spectrophotometer to receive more detailed information. For example, an array of photodetectors each having a filter tuned to filter light at different wavelengths would be able to detect finer resolution on the input light spectrum than a smaller number of filters would.

The spectrophotometer can generate color LAB values, for example. The LAB color space is a color space with dimension L for lightness and dimensions a and b for the color-opponent dimensions, based on CIE XYZ color space coordinates. One important attribute of the L*a*b*-model is device independence. This means that the colors are defined independent of their nature of creation or the device they are displayed on. In other examples, other color space models can be used.

A line sensor usually includes one or more light sources and a light detector. The light sources illuminate a strip of the print zone and the detector senses light which is reflected from said zone to detect the presence of a print medium. When the carriage 10 moves across a print zone (direction C in FIG. 2), the line sensor 14 hence scans the print zone and senses light reflected therefrom. Depending on whether a print medium is present in the print zone or not, the sensor signal will vary wherein the line sensor 14 can detect the presence or absence of an opaque print medium. The sensor output can be used for aligning a printhead 12 relative to the print medium. Printer circuitry, schematically represented by box 100, includes a processor unit 102 which receives the signals from the line sensor 14 and converts them into digital data. Data communication between the sensors 14, 16, 18 and the printer circuitry can be via a printer bus 104, or via a wireless data communication interface, or can be performed by any other suitable means. The processor hence can generally plan calibration data which are applied to image data which are applied to produce an image for controlling the printheads 12.

In addition to a line sensor 14 and a spectrophotometer 16, the printer can comprise an optical media advance sensor (OMAS) which usually is stationary and is placed below the print medium. The optical media advance sensor (OMAS) measures the movement of a medium from the backside of the medium while it travels through the print zone. It can use microscopic structures on the surface of the medium for alignment. While it works well for opaque media, it is not optimized for transparent, semitransparent or porous media.

High-quality printers, including large format printers such as Latex Designjet printers of the applicant, usually include a line sensor 14, an optical media advance system 18 (see FIG. 2) and an embedded spectrophotometer 16 wherein the spectrophotometer provides measurement of printed color patches for closed-loop color calibration and may achieve linearization for specific combinations of ink and media.

In one example of the present disclosure, the spectrophotometer 16, besides being used for color calibration, can be used for detecting at least one edge of the print medium. Edge detection using the spectrophotometer 16 can be successful even when the print medium is not opaque but is transparent, semitransparent or porous.

For such type of print medium, the edge detection via the line sensor 14 or the optical media advance system 18 may fail because a transparent or porous medium will not reflect light in the same way as an opaque medium. The optical line sensor 14 basically detects an edge of the substrate by seeking the difference in light reflected from a white surface (medium is present) and from a black surface (supposed to come from the print platen). The line sensor 14 bases the detectability of media edges on changes in the reflected light captured by the light detector and will not produce a reliable detection result when a medium is transparent or porous because transparent media might not reflect sufficient light and pores may be mistaken for the absence of a print medium. The optical media advance sensor (OMAS) 18, as explained above, detects surface structure on the backside of the print medium which it cannot detect from a transparent medium. It also is not optimized for a porous medium.

Whenever a transparent or porous medium is loaded into the printer, the line sensor 14 hence cannot detect the edges of the medium, nor can the optical media advance sensor 18 correctly locate the medium so that the printer initiates a dialogue asking a user to manually introduce the edges of the media and check correct media position. Further, during printing on a transparent or porous substrate, the line sensor 14 and the OMAS 18 cannot correctly perform their functions to monitor skewing of the medium and to monitor and control the correct media advance of the print medium. When porous substrates are processed, it further may be possible to have "false positive" skewness detection because the sensitivity of a line sensor is not sufficient to distinguish between "white" versus "black" signal properties.

Using the embedded spectrophotometer 16 for edge detection solves this problem.

Figure 2:
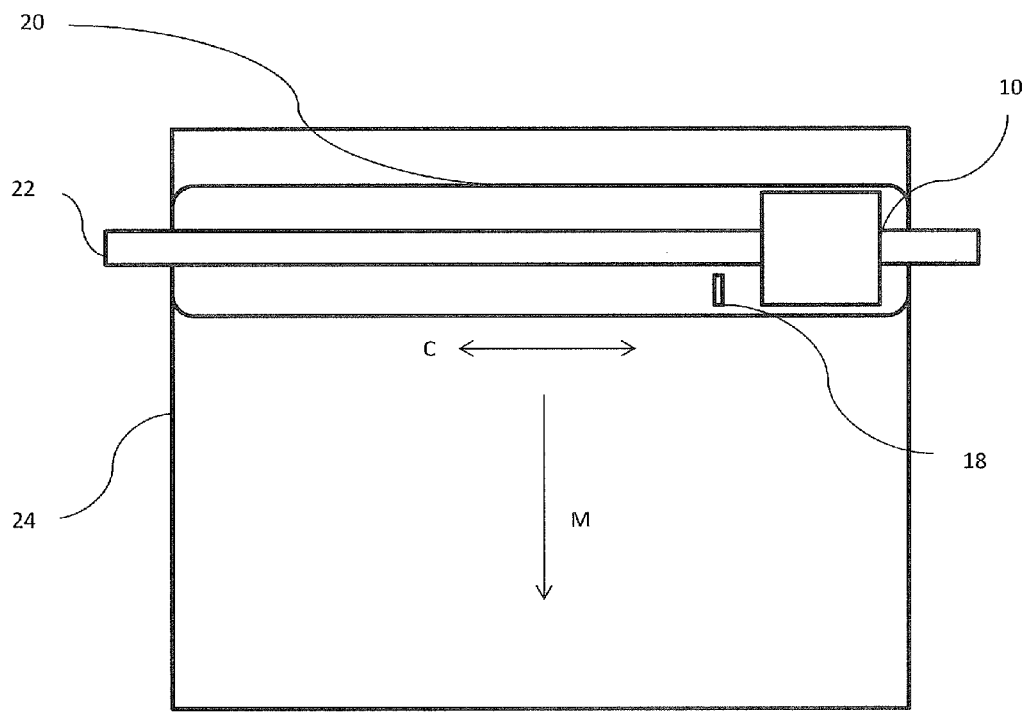
FIG. 2 shows a schematic diagram of a printing system according to one example.

In the example of FIGS. 1 and 2, the carriage 10, carrying the printheads 12, the line sensor 14 and the spectrophotometer 16, moves across a print zone 20 along a rod 22. In another example, the edge detector is provided in a page-wide array printer in which the printheads span the width of the medium but do not scan across the medium on a carriage. The sensors, however, could still be mounted on a carriage or could use some other arrangement to scan the print zone. A print medium or substrate 24 is moved through the print zone 20 wherein the direction of movement of the carriage is designated by C and the direction of forwarded movement of the print medium is shown by arrow M. The printing system further comprises an optical media advance system (OMAS) 18 which is located in the print zone 20 under or on a print platen so that the print media 24 moves through the print zone 20 between the print platen and OMAS 18 on the one side, and the carriage 10, printheads 12, line sensor 14, and spectrophotometer 16, on the other side.

Signals from the line sensor 14, spectrophotometer 16 and OMAS 18 are processed in a printer processing unit (not shown) which also controls movement of the carriage 10 across the print zone 20 and firing of the printheads 12.

The present disclosure hence provides a detector device for detecting an edge of the print medium 24 which, for edge detection, uses at least the spectrophotometer 16 and the processing unit, the spectrophotometer 16 scanning the print zone 20 and generating an output tuple, the processing unit comparing the output tuple to at least one reference tuple for detecting an edge of the print medium 24. Details of the process flow according to one example are described below. The output tuple generated by the spectrophotometer 16 may be an ordered list of detector values, for example values in the LAB color space, including a lightness value L and two color components a, b, for each of a pixel or picture element while the spectrophotometer 16 scans the medium in the print zone 20. Alternatively, an output tuple of the spectrophotometer can be generated by combining the L, a, b values gathered over a number of pixels, such as the pixels in one line or a subset thereof. One pixel can correspond to a field of view of the spectrophotometer, as further explained below with reference to FIG. 4.

In one example, the spectrophotometer 16, while scanning the print medium 24, captures LAB values and compares them to pre-calibrated standard values of white and black measures to provide edge detection and skew monitoring. The processing unit of the printing system can store pre-calibrated standard values in a memory, such as a look-up table, wherein the values are used as reference tuples and can be provided for different standard situations. Examples of standard situations are: the spectrophotometer scanning an empty printer platen; the spectrophotometer scanning a white medium; the spectrophotometers scanning a colored medium; the spectrophotometers scanning a transparent or partly transparent medium; the spectrophotometers scanning a porous medium; and the like. Not all of these reference tuples need to be provided in combination. Comparison of the output tuple of the spectrophotometer and the at least one reference tuple can be made by calculating differences in multiple dimensions, such as the L, a and b dimensions of the LAB color space, to seek for variations in the detected spectral components and to derive the type of medium present in the field of view of the spectrophotometer therefrom. Instead of comparing the output tuples of the spectrophotometer to one or more predefined reference tuples, it also is possible to generate a number of output tuples from a sequence of scans of the spectrophotometer, wherein the spectrophotometer scans across the print medium in the C direction and/or the print medium moves relative to the spectrophotometer in the M or (−M) direction, and to compare subsequent output tuples relative to each other wherein at least one of said output tuples is used as a reference tuple. The OMAS 18 and the line sensor 14 can support the spectrophotometer in determining whether the medium present in the print zone is transparent or porous.

Figure 3:
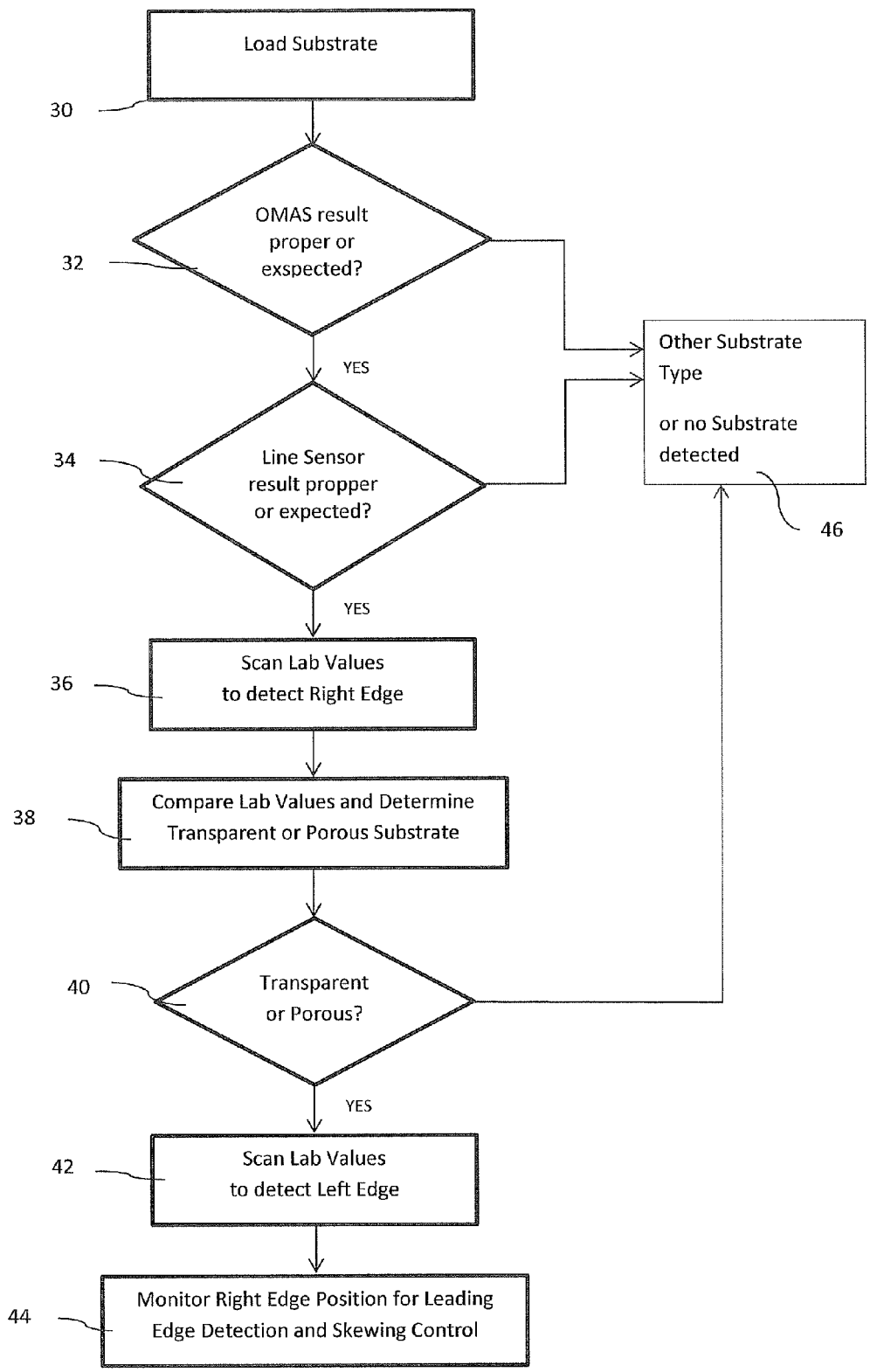
FIG. 3 shows an example of a flow diagram of a method of detecting an edge of a medium according to one example.

An example of a respective method of detecting an edge of a medium is described with reference to FIG. 3.

The method starts with loading a print medium or substrate 22 into the printing system, at block 30. The print medium or substrate 24 can be loaded manually or automatically. It can be a sheet-like medium or a roll medium. The print medium can be opaque, transparent, semitransparent, porous, or the like. It can be made from paper, cardboard, plastic, fabrics, fibers, including natural fibers and plastic fibers, etc. If made from fibers, it can be woven, knitted, non-woven, etc.

When the substrate 24 enters the print zone 20, the optical media advance sensor 18 will be activated and try to scan the substrate 24 from underneath to check for media advance. If the OMAS 18 does not deliver a proper or expected result, as queried in block 32, this could be an indication that there is a transparent or porous substrate present in the print zone. Further, during loading of the substrate, also the line sensor 14 will start to operate and scan the print zone 20, the line sensor 14 moving with the carriage 10. The line sensor would usually detect media edges in changes of reflected light to distinguish between e.g. a white substrate and the black or transparent dark printer platen. If the line sensor 14 does not deliver a useful or expected result, as queried in block 34, this could be an indication of a transparent or porous substrate in the print zone. The order of blocks 32 and 34 can be inverted in other examples.

The method then proceeds the block 36, where the spectrophotometer 16 is activated to scan the print zone and to capture LAB values during said scan. A processor (not shown) of the printing system will process the output values of the spectrophotometer wherein an output tuple could be defined by three values, corresponding to the L, a and b values of one pixel or by N times three values corresponding to a scan line of N pixels. The output tuple is compared to one or more reference tuples in the processor to determine whether a transparent or porous substrate is present; see block 38. Depending on the comparison result, in block 40, it is determined whether there is a transparent or porous substrate present in the print zone.

The following tables indicate representative color values of an example where no substrate, a white substrate and a transparent substrate are present in the print zone. It is noted that the values given in the tables are merely illustrative examples for explaining some principles of this disclosure, without intending any limitation thereof

TABLE I

BLACK PLATEN BACKGROUND LAB MEASUREMENTS

| Scan | L | a | b |
|---|---|---|---|
| 1 | 25.97 | −0.2524 | −2.1635 |
| 2 | 25.9453 | −0.2627 | −2.2208 |
| 3 | 25.9469 | −0.2558 | −2.2060 |
| 4 | 25.9422 | −0.2864 | −2.1085 |
| 5 | 25.9424 | −0.2690 | −2.1213 |
| Range | ~[25.9-26.0] | ~[−0.25−−0.3] | ~[−2.1−−2.25] |

Table I shows an example of respective tuples generated by a spectrophotometer when scanning an empty platen which usually is black or transparent with a black or dark background. Each scan of the print medium in the print zone will produce a group of values L, a, b, herein referred to as tuple, representing a lightness value L, an a-color value and a b-color value. When there is no change in the scanning background, the tuple values among the different scans will be very close to each other wherein, in the example of table I, the L value is in a range from about 25.9 to 26. The a value is in a range of about −0.25 to −0.3; and the b value is in a range of about −2.1 to −2.25. Accordingly, by setting corresponding reference values or reference value ranges and by comparing the measured LAB values with said reference values or reference value ranges, it can be determined whether the spectrophotometer is scanning an empty/black platen.

TABLE II

WHITE MEDIA LAB MEASUREMENTS

| Scan | L | a | b |
|---|---|---|---|
| 1 | 93.96 | −0.7978 | −1.8595 |
| 2 | 94.0059 | −0.7996 | −1.8548 |
| 3 | 94.005 | −0.7973 | −1.8628 |
| 4 | 94.0233 | −0.7992 | −1.8575 |
| 5 | 94.024 | −0.7931 | −1.8742 |
| Range | ~[93.9-94.1] | ~[−0.75−−0.8] | ~[−2.1−−2.25] |

Table II shows examples of L, a and b values when scanning a white medium, such as white paper, wherein, again, the values of the output tuple generated by the spectrophotometer will lie within a very narrow range of values, as indicated in the last line of table II. By setting a corresponding reference tuple or corresponding ranges of tuple values, and by comparing the measured L, a, b values with said reference tuple, it can be determined whether the spectrophotometer scans a white medium. Further reference tuple values can be generated for any other colored opaque medium.

TABLE III

TRANSPARENT MEDIA LAB MEASUREMENTS

| Scan | L | a | b |
|---|---|---|---|
| 1 | 25.0537 | −0.497058 | −3.21209 |
| 2 | 25.1369 | −0.476092 | −3.43717 |
| 3 | 25.1758 | −0.541821 | −3.38284 |
| 4 | 25.1739 | −0.523463 | −3.37302 |
| Range | ~[25.0-25.2] | ~[−0.45−−0.6] | ~[−3.2−−3.45] |

Table III shows examples of values which could be obtained when the spectrophotometer scans a transparent medium in the print zone and generates corresponding L, a and b values which, again, are within relatively narrow ranges for each of the scans of the transparent medium. A comparison of tables I, II and III shows that scanning a transparent medium will result in lightness values L which are close to the L value of an empty/black platen so that evaluating only the L value would not be sufficient to distinguish between a transparent medium and no medium. However, the a and b values are considerably different from the a and b values obtained when detecting an empty platen or a white medium on the platen. The presence of a transparent medium hence can be detected by comparing the output tuple L, a and b with a corresponding reference tuple or reference value ranges.

While it is possible to define a reference tuple for each type of medium, for distinguishing between different media, is also possible to define only one or a small number of reference tuples and determine how much the respective L, a and b values deviate from the reference tuple. If, in the above example, a single reference tuple would be determined based on the average values for an empty/black platen, the reference tuple could be L=25.95; a=−0,255; and b=−2,15. The detection rules then could be defined as follows, assuming a tolerance of the measurement accuracy of +/−5%:

if L (measured)=L (reference)+/−5%: black platen or transparent medium
if L (measured)>L (reference)+/−5%: white medium
if |a (measured)|=|a (reference)|+/−5%: black platen
if |a (measured)|>|a (reference)|+/−5%: white medium or transparent medium
if |b (measured)|=|b (reference)|+/−5%: black platen
if |b (measured)|>|b (reference)|+/−5%: transparent medium
if |b (measured)|<|b (reference)|+/−5%: white medium In another example, it is possible to determine the type of medium from a comparison of pixel values detected from a black/empty platen and pixel values detected when scanning the medium, wherein the pixel values gathered from a black/empty platen could be used as reference value(s).

Figure 4:
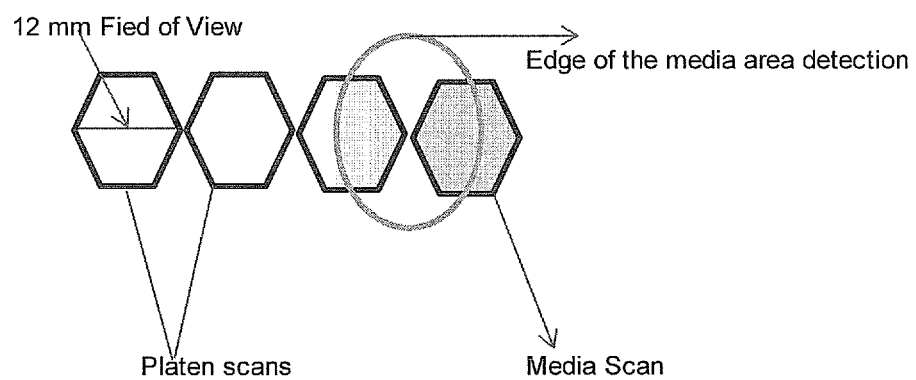
FIG. 4 is a schematic diagram for illustrating the example of FIG. 4.

Once the type of medium has been detected, in block 44, the spectrophotometer scans the medium to detect one of the right and left side edges, as explained with reference to FIG. 4. As shown in FIG. 4, the spectrophotometer has a certain field of view which, in the example is indicated to be 12 mm, without implying any limitation. While the spectrophotometer scans the medium in the print zone, it captures L, a and b values which differ depending on the scanning background. FIG. 4 shows an example, where the spectrophotometer scans from left to right and, in the fourth scanned pixel, detects the edge of a medium, i.e. transition from an empty/black platen to a medium resting on the platen. At this transition, the values of the output tuple of the spectrophotometer will change e.g. from those in table I to those in table II or III. The position of this transition can be used to determine a side edge of a medium in block 42.

In the next block 44, the leading edge of the medium is detected by moving the medium backwards through the printing zone 20, while the carriage is in a fixed position, and scanning the medium in the direction of medium advance until a transition from the medium to the empty/black platen is detected, e.g. as described above with reference to FIG. 4. The sequence of blocks 42 and 44 can be inverted in some examples.

Figure 5:
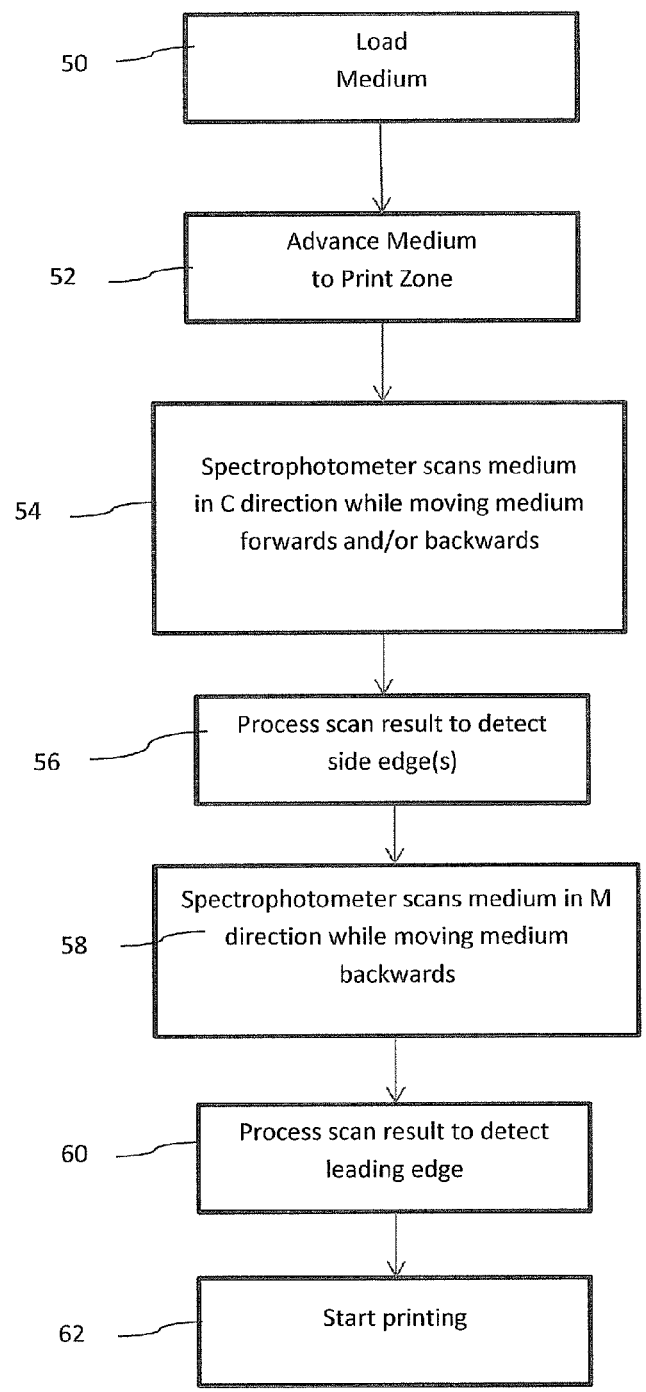
FIG. 5 shows an example of a flow diagram of a method of detecting an edge of a medium according to another example.

In a practical example, illustrated in FIG. 5, the method to detect one or both of the side edges and the leading edge of the print media proceeds as follows. The print medium is loaded into the printing system (block 50) and is advanced to the print zone (block 52). Several movements of the medium, which can be in the forward and backward direction, are performed while the spectrophotometer moves over and scans the medium (in the C direction) (block 94) to find one or both side edges (block 56). Once a side edge has been detected, the leading edge is not yet known. To also detect the leading edge, the medium is moved backwards while the spectrophotometer is positioned along the detected side edge just above the medium previously detected (block 58). The side edge of the medium is then scanned in the print medium advance direction (M), while the medium is being moved backwards, i.e. in the (−M) direction, to determine where the leading edge is (block 60), using basically the same detection principle as explained with reference to FIG. 4 above. Once, the side edges and the leading edge have been detected, printing can start (block 62). In this example, the side edge(s) hence is (are) detected by moving the medium into the print zone, possibly making several media movements in the direction M, while the spectrophotometer scans the medium in the direction C. During each individual scan of spectrophotometer, the medium is not moved but scans are performed between individual increments of medium advance. The leading edge, on the other hand, is detected by keeping the spectrophotometer in a fixed position and moving the medium backward out of the print zone until a transition from the print medium to the empty/black platen is detected. Additionally, the auxiliary sensors, such as OMAS and line sensor, can be used before or after scanning the medium with the spectrophotometer to verify the scanning results. It should be noted that the present disclosure is not limited to any particular sequence of detecting edges nor to any particular sequence of using the spectrophotometer and auxiliary sensors, such as the optical medium advance sensor and the line sensor.

Once the side edges and the leading edge of the print medium has been detected, the same measurement principle as explained above also can be applied to skewing control while the print medium advances through the print zone by continuously monitoring the position of the side edges.

Further, to improve accuracy, it is possible to process a number of scans and hence a number of output tuples of the spectrophotometer while the print medium is stationary or moving and to sample these scans such as by averaging, weighting, filtering, statistical analysis and the like. For example, for edge detection it is possible to perform a number of different short scans such as four to five scans in a narrow area near the edges to better determine where exactly the edge is.

What is claimed is:

1. A detector device for detecting an edge of a medium in a media processing system, the detector device comprising:
    a spectrophotometer to scan a medium in a media processing area and generate an output tuple; and
    a processing unit to compare the output tuple to a reference tuple for detecting an edge of a medium.

2. The detector device of claim 1, wherein the spectrophotometer generates an output tuple in the LAB color space, including a lightness value L and two color components a, b.

3. The detector device of claim 1, wherein the processing unit accesses a look-up table including the reference tuple for:
    the spectrophotometer scanning an empty platen;
    the spectrophotometer scanning a white medium;
    the spectrophotometer scanning a medium;
    the spectrophotometer scanning a transparent medium; or
    the spectrophotometer scanning a partly transparent medium.

4. The detector device of claim 1, wherein the spectrophotometer is mounted on a carriage that moves over the media processing area.

5. A printing system comprising:
    a loading unit for loading a print medium into the printing system;
    a media advance unit for transporting the print medium into and through a printing zone; and
    a monitoring unit for monitoring a printing result, the monitoring unit to:
        detect, based on a comparison of sensor data to a reference tuple,
    an edge of the print medium or skewness of the print medium or both.

6. The printing system of claim 5, wherein the monitoring unit comprises a spectrophotometer.

7. The printing system of claim 6, wherein:
    the spectrophotometer scans the printing zone and generates an output tuple; and the monitoring unit detects an edge of the print medium by comparing the output tuple of the spectrophotometer to the reference tuple.

8. The printing system of claim 7, wherein the monitoring unit accesses a set of reference tuples to determine whether the print medium is opaque, transparent or porous.

9. The printing system of claim 8, further comprising:
a movable line sensor; or
a stationary media advance sensor device,
wherein the monitoring unit processes an output of the line sensor or the media advance sensor device for determining whether a print medium is transparent or porous.

10. A method of detecting an edge of a medium in a media processing system, the method comprising:
scanning a medium in a media processing area by a spectrophotometer;
generating an output tuple;
comparing the output tuple to a reference tuple for detecting an edge of the medium.

11. The method of claim 10, further comprising:
gathering a plurality of output tuples from the spectrophotometer while the spectrophotometer scans the media processing area; and
processing the plurality of output tuples by repeatedly comparing each respective output tuple or a mean value of a number of output tuples or both to a respective reference tuple to determine a side edge of the medium.

12. The method of claim 11, further comprising:
after having determined the side edge of the medium, generating a plurality of output tuples while scanning the medium and while the medium moves through the media processing area; and
processing the plurality of output tuples by comparing each respective output tuple or a mean value of a number of output tuples or both to a respective reference tuple to determine a leading edge of the medium.

13. The method of claim 10, further comprising:
scanning the medium by a spectrophotometer at least twice and generating at least two respective output tuples; and
evaluating the at least two output tuples to detect a leading edge of the medium when there is a significant change between the output tuples generated in subsequent scans.

14. The method of claim 10, further comprising:
detecting the presence of a porous medium as a function of significant changes of tuple values within one scan or between subsequent scans of the spectrophotometer.

15. The method of claim 10, comprising:
generating, via the spectrophotometer, a plurality of output tuples while scanning the medium in the media processing area; and
processing the plurality of output tuples by comparing output tuples with each other wherein an output tuple of the plurality of output tuples is used as a reference tuple for other output tuples of the plurality of output tuples.

* * * * *

UNITED STATES PATENT AND TRADEMARK OFFICE
CERTIFICATE OF CORRECTION

PATENT NO. : 9,662,909 B2
APPLICATION NO. : 15/030264
DATED : May 30, 2017
INVENTOR(S) : Antonio Gracia Verdugo et al.

Page 1 of 1

It is certified that error appears in the above-identified patent and that said Letters Patent is hereby corrected as shown below:

In the Drawings

In sheet 2 of 4, reference numeral 32, Line 3, delete "exspected?" and insert -- expected? --, therefor.

Signed and Sealed this
Third Day of October, 2017

Joseph Matal
*Performing the Functions and Duties of the*
*Under Secretary of Commerce for Intellectual Property and*
*Director of the United States Patent and Trademark Office*